United States Patent
Björklund et al.

(10) Patent No.: US 7,665,763 B2
(45) Date of Patent: Feb. 23, 2010

(54) INFLATOR FOR AN AIR-BAG

(75) Inventors: Kent-Ake Björklund, Vårgåda (SE); Mats Johannson, Fristad (SE); Peter Qvint, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 22 days.

(21) Appl. No.: 11/658,820

(22) PCT Filed: Jul. 1, 2005

(86) PCT No.: PCT/SE2005/001055

§ 371 (c)(1), (2), (4) Date: Jan. 26, 2007

(87) PCT Pub. No.: WO2006/016840

PCT Pub. Date: Feb. 16, 2006

(65) Prior Publication Data

US 2008/0284148 A1    Nov. 20, 2008

(30) Foreign Application Priority Data

Aug. 13, 2004  (GB)  .................... 0418122.8

(51) Int. Cl.
  *B60R 21/26* (2006.01)
(52) U.S. Cl. .................. 280/737; 280/736; 280/741
(58) Field of Classification Search .............. 280/736, 280/737, 741; 137/59
  See application file for complete search history.

(56) References Cited

U.S. PATENT DOCUMENTS

| 4,275,901 A | * | 6/1981 | Okada ................ 280/741 |
| 5,474,328 A | | 12/1995 | Nilsson et al. |
| 5,582,806 A | | 12/1996 | Skanberg et al. |
| 5,690,357 A | * | 11/1997 | Cuevas ................ 280/737 |
| 5,700,030 A | | 12/1997 | Goetz ................. 280/736 |
| 5,725,243 A | * | 3/1998 | Skanberg ............. 280/737 |
| 5,860,443 A | | 1/1999 | Soemer et al. |
| 5,947,143 A | * | 9/1999 | Moakes et al. ........... 137/69 |
| 6,206,420 B1 | | 3/2001 | Skanborg et al. ......... 280/737 |

(Continued)

FOREIGN PATENT DOCUMENTS

DE    1939375 A    8/1970

(Continued)

*Primary Examiner*—Ruth Ilan
*Assistant Examiner*—Keith Frisby
(74) *Attorney, Agent, or Firm*—Harness, Dickey & Pierce, P.L.C.

(57) ABSTRACT

An inflator for an air-bag comprises at least one gas bottle (1, 2) containing pressurized gas. The gas bottle is sealed by a rupturable foil (9). There is a support member (15) engaging the rupturable foil to maintain it in an unruptured state. The support member (15) is retained in an initial position by a part (23) of a piston element (20) which directly engages the support member (15). The piston element (20) is associated with a squib (11) to drive the piston element from an initial position to a release position in which the piston element no longer engages the support member (15). This permits the support member (15) to move to a position in which the foil (9) will rupture to permit gas to escape from the bottle. The preferred embodiment has two gas bottles each sealed by a respective foil each maintained by a support member which directly engages a single piston member.

20 Claims, 3 Drawing Sheets

U.S. PATENT DOCUMENTS

Figure 4:
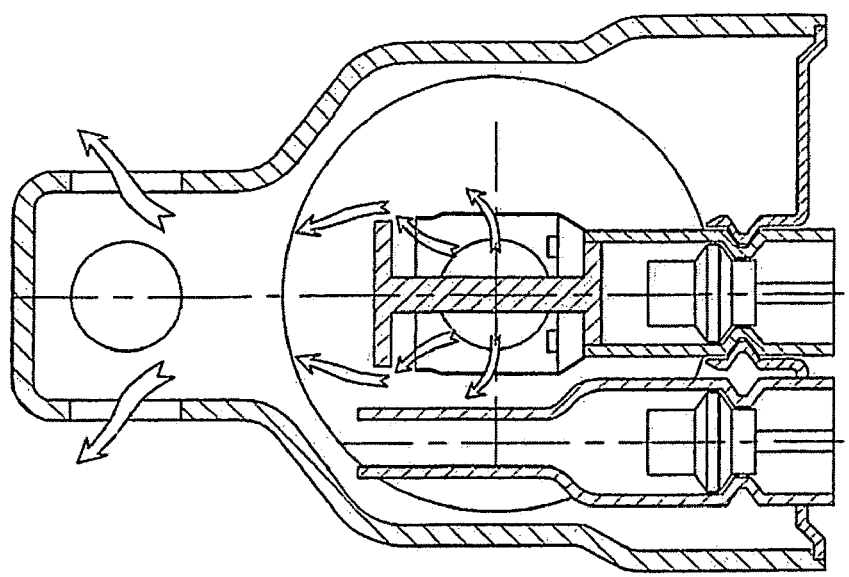

| | | |
|---|---|---|
| 6,247,725 B1 | 6/2001 | Moller et al. |
| 7,137,646 B2 | 11/2006 | Blackburn et al. .......... 280/737 |
| 2002/0074036 A1 | 6/2002 | Specht et al. |
| 2002/0130502 A1* | 9/2002 | Jonsson et al. .............. 280/737 |
| 2003/0001369 A1* | 1/2003 | Iwai et al. ................... 280/741 |
| 2005/0052007 A1 | 3/2005 | Blackburn et al. .......... 280/737 |

FOREIGN PATENT DOCUMENTS

| | | |
|---|---|---|
| EP | 0862004 A2 | 9/1998 |
| GB | 1302805 A | 1/1973 |
| GB | 2277984 A | 11/1994 |
| GB | 2302169 A | 1/1997 |
| GB | 2320557 | 6/1998 |
| GB | 2373310 A | 9/2002 |

\* cited by examiner

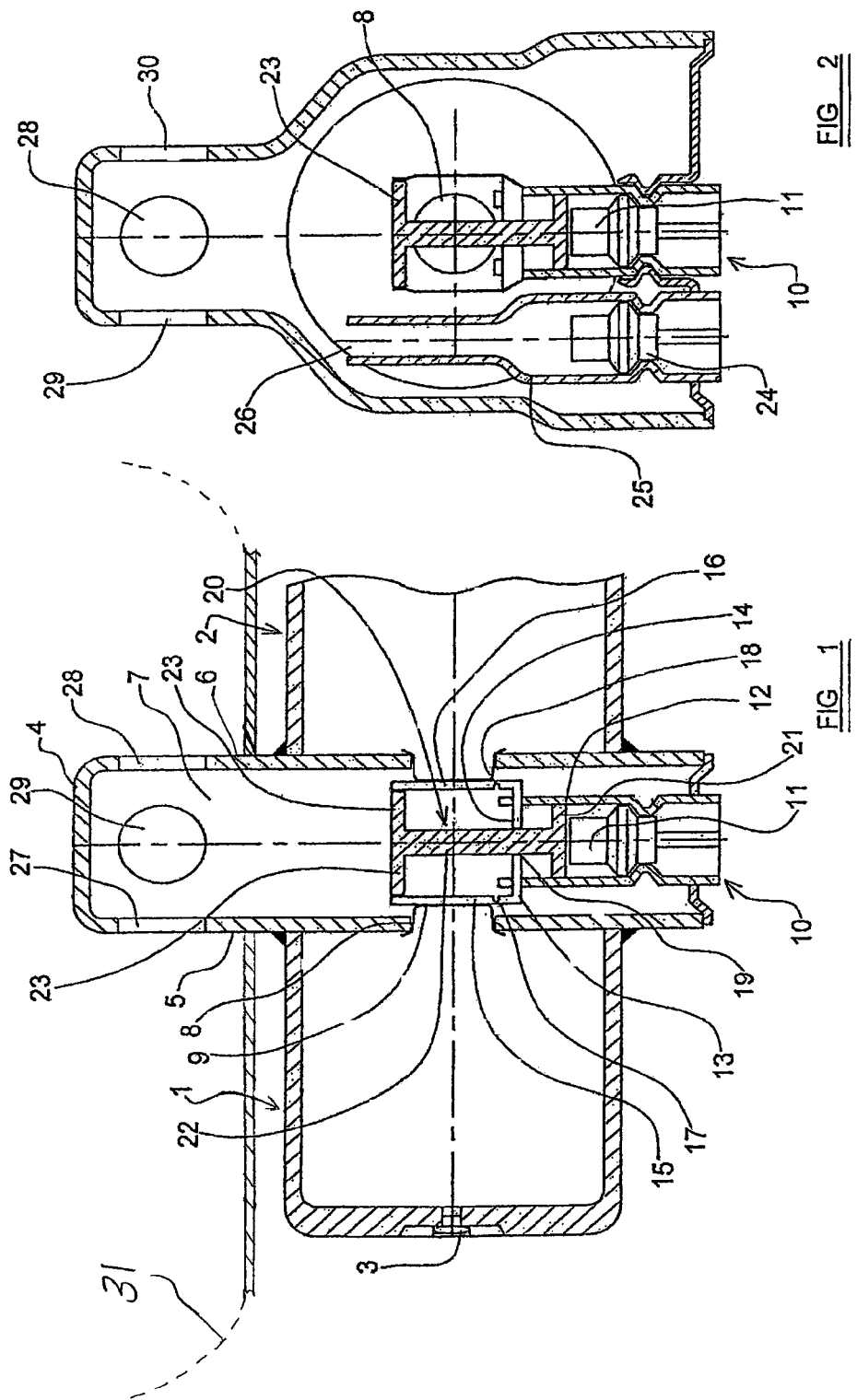

INFLATOR FOR AN AIR-BAG

CROSS-REFERENCE TO RELATED APPLICATIONS

This application is a U.S. National Stage Application of International application No. PCTSE2005/001055, filed Jul. 1, 2005. This application claims the benefit of Great Britain Application Serial No. 0418122.8, filed Aug. 13, 2004. The disclosure(s) of the above applications are incorporated herein by reference.

The present invention relates to an inflator for an air-bag, such as an air-bag provided in a vehicle to provide protection for the occupant of the vehicle in the event that an accident should occur.

It has been proposed to provide air-bag inflators which incorporate one or two bottles or pressure vessels containing gas under pressure. Each bottle may be sealed by a metal foil. The metal foil is initially supported by means of a support element which is held in position against the exterior of the foil. When the air-bag is to be inflated the support member is moved away from the metal foil, enabling the foil to rupture and thus enabling the gas to escape from the gas bottle and flow into the interior of the air-bag to inflate the air-bag.

In prior proposed inflators of this general type one gas bottle may contain a fuel, in the form of an oxidisable gas and the other bottle may contain an oxidising gas. The gases, when they escape from the gas bottles are mixed. Subsequently, when the gases are within the air-bag, the gases may be ignited to complete inflation of the air-bag DE 1,939,375 shows an inflator of this general type. In the preferred embodiments a relatively complicated arrangement is provided to retain the support elements which support the foils in the initial position. The arrangement is complicated to manufacture and involves a number of parts, thus being relatively expensive.

A further problem with the prior art is that if an inflator which has pressurised gas within a gas bottle is subjected to a very high temperature, for example if a vehicle in which the inflator is mounted should catch fire, there is a risk that the gas bottle may explode. Of course, this would be extremely disadvantageous to any person trapped within the vehicle, or any fire fighter fighting the fire.

The present invention seeks to provide an improved inflator.

According to this invention there is provided an inflator for an air-bag, the inflator comprising at least one gas bottle containing pressurised gas, the gas bottle being sealed by a rupturable foil, there being a support member engaging the rupturable foil to maintain the rupturable foil in an un-ruptured state, wherein the support member being mounted in position and being retained in position by part of a piston element which directly engages the support member, the piston element being associated with a squib to drive the piston element from an initial position to a release position in which the piston element no longer engages the support member, permitting the support member to move to a position in which the foil will rupture to permit gas to escape from the gas bottle.

Preferably the support member is formed as part of a bracket in the form of a support arm which extends substantially perpendicularly from a base.

Advantageously the support member is yieldable, and is configured to yield in response to the pressure of the gas in the gas bottle exceeding a predetermined threshold, thus enabling the foil to rupture.

Conveniently the support member has a line of mechanical weakness such that the line of mechanical weakness will break and the support member will yield when gas pressure in the gas bottle exceeds the predetermined threshold, thus enabling the foil to rupture.

Advantageously two gas bottles are provided, each having a said rupturable foil and each foil being associated with a said support member.

Preferably the two support members form part of a single bracket, the support members being engaged by respective parts of a single piston element.

Conveniently each gas bottle is sealed by a respective one of two parallel spaced-apart planar walls, each wall defining a respective aperture, each aperture being sealed by a respective said rupturable foil, the said piston being provided in a chamber defined between the two walls.

Preferably one bottle contains a fuel or oxidisable gas and the other bottle contains an oxidising gas.

Conveniently the fuel or oxidisable gas comprises hydrogen, ethane, methane, propane or butane.

Advantageously the oxidisable gas is mixed with one or more inert gases.

Preferably the oxidising gas is air, oxygen or nitrous oxide.

Conveniently the oxidising gas is mixed with one or more inert gases.

Advantageously a flame channel is provided from the squib to the exterior of the inflator to ignite mixed gas from the two gas bottles.

In an alternative embodiment a second squib is provided to ignite mixed gas from the two gas bottles.

Conveniently the second squib is mounted adjacent the first squib and is provided with a flame-guide.

Alternatively the second squib is mounted on the exterior of the inflator.

The invention also relates to an air-bag provided with an inflator of the type described above.

Figure 3:
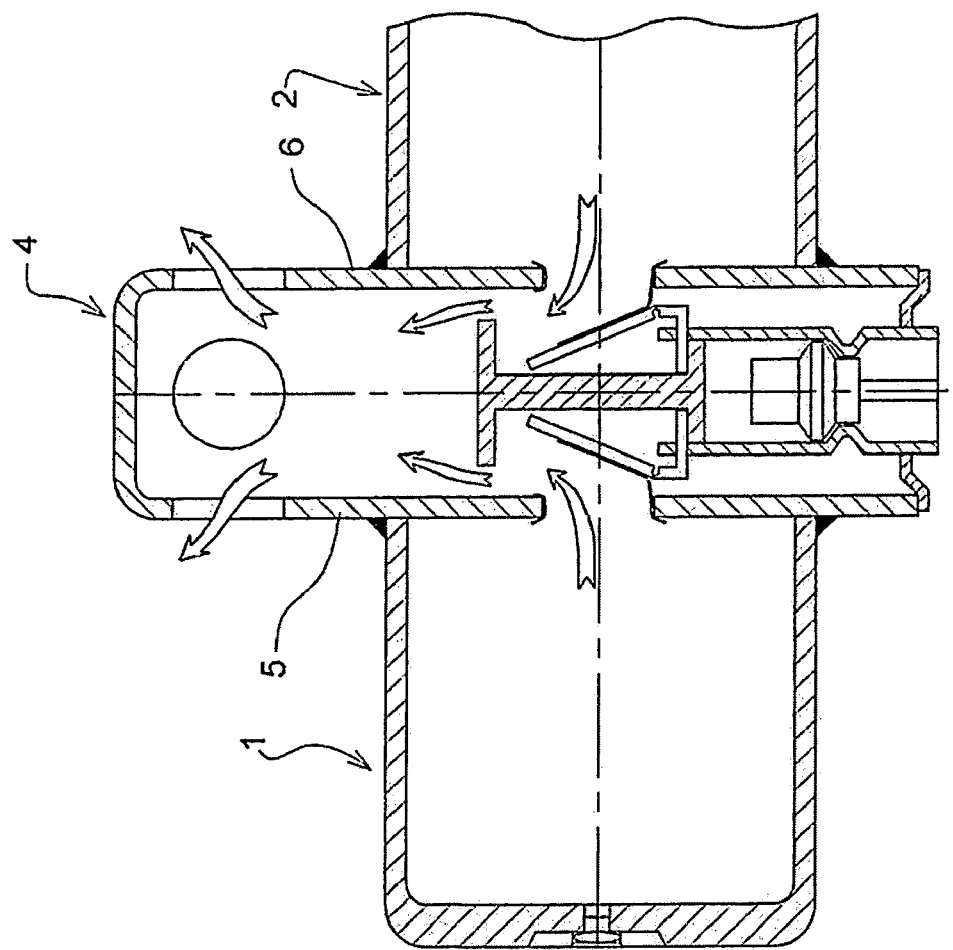
Figure 5:
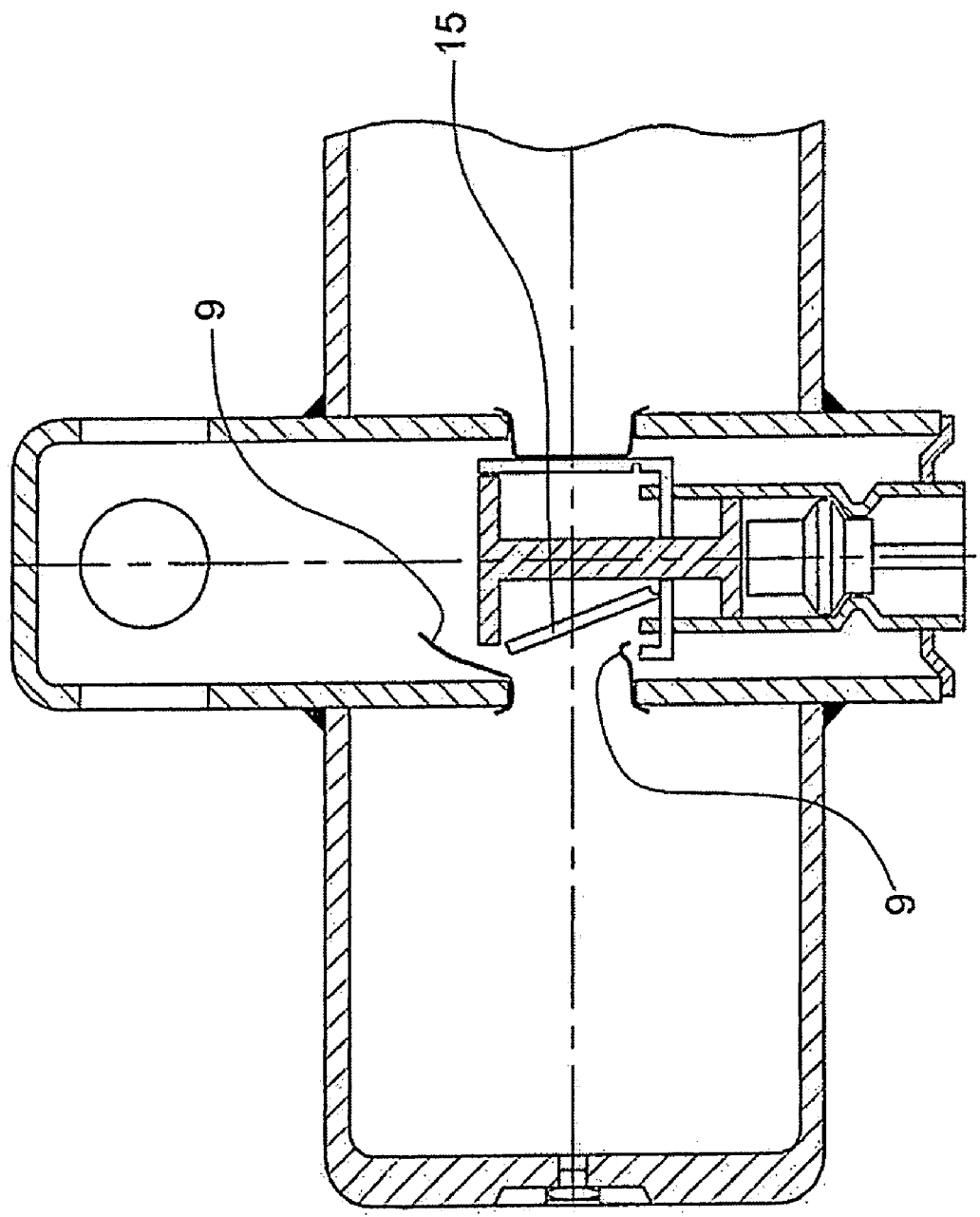

In order that the invention may be more readily understood and so that further features thereof may be appreciated, the invention will now be described, by way of example, with reference to the accompanying drawings in which:

FIG. 1 is a lateral sectional view of part of an inflator in accordance with the invention in an initial position, FIG. 2 is a transverse sectional view of the inflator of FIG. 1, FIG. 3 is a view corresponding to FIG. 1 illustrating the inflator when in an actuated position, FIG. 4 is a view corresponding to FIG. 2, again showing the inflator when in the actuated condition, and FIG. 5 is another view corresponding to FIG. 1 showing the inflator in another condition.

Referring initially to FIG. 1, an inflator comprises a first gas bottle 1 and a second gas bottle 2. Only part of the second gas bottle 2 is shown, but the second bottle 2 is the mirror image of the first bottle 1. The gas bottle 1 has a base and a tubular side-wall and is shown with a filling aperture 3 provided in its base.

The open ends of the gas bottles 1 and 2 are secured to a central housing 4. The central housing has two spaced-apart vertical planar walls 5, 6 which define between them a chamber 7. The vertical walls each have a bell-shape, with a narrow top and a broader base, as can be seen from FIG. 2. Each wall 5, 6 seals the end of a respective gas bottle 1, 2. Formed in the central part of each wall is an aperture, such as the aperture 8 in the wall 5, the aperture being sealed by means of a metal foil, such as the metal foil 9. The metal foil thus serves to seal the gas bottle 1. A corresponding aperture 8 and metal foil are provided in the wall 5 which seals the gas bottle 2.

Mounted, in the chamber between the two walls 5 and 6 is a first squib unit 10. The first squib unit 10 comprises a pyrotechnic squib 11, which is mounted within a tubular support 12, the tubular support 12 extending above the squib 11 and defining a circular cross-section chamber. The upper part of the support 12 supports a "U"-shaped bracket 13, the bracket 13 having (in the orientation shown) a horizontal base 14 and two upstanding planar arms 15 and 16 which extend perpendicularly from the base. The upstanding arms 15, 16, in this embodiment, are each provided with a line of mechanical weakness 17, 18 at a position where each arm is connected to the base 14. The bracket is formed from a planar metal strip which is bent or folded to have the appropriate form, or may be of a moulded plastic material.

An aperture 19 is provided in the central part of the base 14, the aperture being located above (in the orientation shown) the pyrotechnic squib 11. Part of a piston element 20 extends through the aperture 19, as will be described.

The piston element 20 is provided with a piston head 21 received within the circular cross-section chamber defined above the squib by the support 12. The piston includes a piston rod 22 which extends, from the piston head 21, upwardly through the aperture 19 formed in the base 14 of the bracket 13. The upper end of the piston rod 22 carries outwardly directed support flanges 23 which extend outwardly and which, in the initial position of the components as illustrated in FIG. 1, directly engage the upper-most ends of the arms 15, 16 of the bracket 13.

The arms 15, 16 of the bracket 13 lie adjacent the foils which seal the gas bottles 1 and 2. The arms 15, 16 act as support members to support the foils.

A second squib unit 24 is provided located in the chamber 7 between the opposed walls 5 and 6, the second squib 24 being within a tubular flame guide 25. The tubular flame guide 25 has an open upper end 26.

The upper-most parts of the opposed walls 5 and 6 are each provided with a gas flow aperture 27, 28 leading from the chamber 7 to the exterior of the inflator. Further apertures 29, 30 are also provided at the top of the chamber 7.

The gas bottles 1 and 2 may both contain an inert gas, but in a preferred embodiment of the invention one gas bottle contains a fuel in the form of a combustible gas such as, for example, hydrogen, methane, ethane, propane or butane, or a mixture of one or more such gases. The fuel may be provided in a pure form or in admixture or mixed with an inert gas such as nitrogen, argon, helium or carbon dioxide. The pressure of gas within the vessel may be such that the gas is in partly liquidised form. The other gas bottle 2 may contain an oxidising gas such as air, oxygen or nitro-oxide. The oxidising gas may be again mixed with an inert gas such as nitrogen, argon, helium, carbon dioxide or mixtures thereof. Again the pressure may be such that the gas is partially liquified.

When the air-bag 31 is to be inflated, the first squib 11 will be actuated. Gas generated by the squib will apply a force to the piston head 21 moving the piston 20 upwardly. The piston 20 thus moves to a position in which the piston head 21 engages the under-surface of the base 14 of the bracket 13, and the outwardly directed flanges 23 are moved upwardly above the upper ends of the arms 15, 16 of the bracket 13. The arms 15, 16 are no longer supported at their upper ends. This enables the arms to pivot inwardly, about the lines of mechanical weakness 17, 18 so that the arms 15, 16 no longer provide support to the foils, such as the foil 9, enabling the foils to rupture. As shown by arrows in FIG. 3, gas from the gas bottles 1 and 2 will thus flow through the now open apertures, such as the aperture 8, past the outwardly directed flanges 23 of the piston 20, and out through the gas flow apertures 27, 28, 29, 30 into the interior of the air-bag 31. As the gases flow, so the gases will be mixed.

When the gases have flowed to the interior of the air-bag 31, thus partially inflating the air-bag 31, the second squib 24 will be ignited, and a flame from the squib will be directed upwardly by the flame-guide 25. The flame will ignite the mixed gas within the chamber 7, and within the air-bag 31. As the mixed gas ignites, so the temperature of the gas rises thus substantially increasing the volume of the gas, completing rapid inflation of the air-bag 31.

Should the gas pressure within each gas bottle 1 or the gas bottle 2 rise to an unacceptable level before deployment of the air-bag 31, the pressure applied to the respective metal foil, such as the foil 9, will be such that the force applied to the respective arm 15, 16 of the bracket 3 will cause the arm to snap at the line of mechanical weakness 17 or 18 as shown in FIG. 5, and to yield. The arm will thus move away from the foil permitting the foil to rupture and thus allowing the gas to escape without there being any risk of the gas bottle itself exploding. It is to be understood that if there is a vehicle fire, the gas bottle may explode due to the internal pressure of gas if there is no pressure relief valve of this type.

In a modified embodiment the arms 15, 16 of the bracket are configured to yield and deform when subjected to a high pressure of gas, as opposed to snapping at a line of weakness. In either case, the arm yields in response to high gas pressure in excess of a predetermined threshold.

Whilst the invention has been described with reference to a preferred embodiment in which two gas bottles are provided, it is to be appreciated that the invention may be applied to a single gas bottle. In such a situation the bracket 13 will comprise merely the base 14 and one upstanding arm, such as the arm 15.

Whilst the invention has been described with reference to an embodiment in which the second squib 24 is provided between the walls 5 and 6, many different techniques may be utilised to ignite the mixed gas once the mixed gas is present within the air-bag 31. For example, a separate flame channel may be provided extending from the first pyrotechnic unit to the outside of the inflator. A further alternative is to use a pyrotechnic cable extending from the first pyrotechnic unit to a second pyrotechnic unit which is mounted within the air-bag 31 close the inflator. Other techniques may also be utilised.

When used in this Specification and Claims, the terms "comprises" and "comprising" and variations thereof mean that the specified features, steps or integers are included. The terms are not to be interpreted to exclude the presence of other features, steps or components.

The invention claimed is:

1. An inflator for an air-bag, the inflator comprising at least one gas bottle containing pressurised gas, the gas bottle being sealed by a rupturable foil; and a support member having a base and a transversely extending support arm engaging the rupturable foil to maintain the rupturable foil in an un-ruptured state, the support arm being mounted in a position and retained in the position by a piston element, the piston element including a piston rod having a longitudinal axis with a piston head positioned at one end of the rod and extending outwardly therefrom and a support flange positioned at a longitudinally opposite end of the rod and extending transversely therefrom so as to directly engage the support arm, the piston rod extending through an axial bore in the base of the support member such that the support flange is disposed on one side of the base and the piston head is disposed on an opposite side of the base as the support flange, the piston element being associated with a squib to drive the piston element via engagement with the piston head from an initial position to a release position in which the support flange no longer engages the support arm, thereby permitting the support arm to pivot inwardly in a direction away from the foil and the gas bottle to a position in which the foil will rupture to permit gas to escape from the gas bottle.

2. An inflator according to claim 1 wherein the support arm is yieldable, and is configured to yield in response to the pressure of the gas in the gas bottle exceeding a predetermined threshold, thus enabling the foil to rupture.

3. An inflator according to claim 2 wherein the support arm has a line of mechanical weakness such that the line of mechanical weakness will break and the support arm will yield when gas pressure in the gas bottle exceeds the predetermined threshold, thus enabling the foil to rupture.

4. The inflator according to claim 1 in combination with the air-bag.

5. The inflator according to claim 1, wherein the support arm further comprises a line of mechanical weakness positioned proximate the base, the support arm being arranged to pivot inwardly about the line of mechanical weakness in a direction away from the foil and the gas bottle to a position in which the foil will rupture to permit gas to escape from the gas bottle.

6. The inflator according to claim 1, wherein the squib, piston element and aperture in the base of the support member are each disposed about a common longitudinal axis.

7. The inflator of claim 1, wherein the squib includes a tubular support member receiving the squib therein so as to have a portion extend beyond the squib, the portion of the support member extending beyond the squib supporting the base of the support member and forming a chamber that slidably receives the piston head therein.

8. An inflator for an air-bag, the inflator comprising first and second gas bottles each containing pressurised gas, the gas bottles each being sealed by a rupturable foil; and a support member engaging each of the respective rupturable foils to maintain the rupturable foils in an un-ruptured state, the support members each being mounted in a position and retained in the position by a part of a piston element which directly engages each of the support members, the piston element being associated with a squib to drive the piston element from an initial position to a release position in which the piston element no longer engages the support members, thereby permitting each of the support members to pivot inwardly in a direction away from a respective one of the foils and the corresponding first or second gas bottle to a position in which each foil will rupture to permit gas to escape from the corresponding gas bottle; wherein the support members associated with the first and second gas bottles form part of a single bracket, the support members being engaged by respective parts of a single piston element.

9. An inflator according to claim 8 wherein each gas bottle is sealed by a respective one of two parallel spaced-apart planar walls, each wall defining a respective aperture, each aperture being sealed by a respective rupturable foil, the piston being provided in a chamber defined between the two walls.

10. An inflator according to claim 8 wherein the first bottle contains one of a fuel and an oxidisable gas and the second bottle contains an oxidising gas.

11. An inflator according to claim 10 wherein the one of the fuel and the oxidisable gas is selected from the group comprising hydrogen, ethane, methane, propane and butane.

12. An inflator according to claim 11 wherein the oxidisable gas is mixed with at least one inert gas.

13. An inflator according to claim 11 wherein the oxidising gas is selected from the group comprising air, oxygen and nitrous oxide, and wherein the oxidising gas is mixed with at least one inert gas.

14. An inflator according to claim 8 wherein a flame channel is provided from the squib to the exterior of the inflator to ignite mixed gas from the first and second gas bottles.

15. An inflator according to claim 8 wherein a second squib is provided to ignite mixed gas from the first and second gas bottles, the second squib being mounted adjacent the first squib and including a flame guide.

16. An inflator according to claim 15 wherein the second squib is mounted on the exterior of the inflator.

17. An inflator for an air-bag, the inflator comprising:
first and second gas bottles each containing pressurised gas, the gas bottles each being sealed by a rupturable foil;
a support member having a base and upwardly extending support arms positioned at each end of the base and substantially perpendicular to the base, each of the support arms being mounted in a position to directly engage one of the respective rupturable foils to maintain the rupturable foils in an un-ruptured state;
a piston element including a piston rod having a longitudinal axis with a piston head positioned at one end of the rod and extending outwardly therefrom and a support flange positioned at a longitudinally opposite end of the rod and extending transversely therefrom, the support flange being positioned to directly engage an upper end of each support arm opposite the base to retain the support arms in direct engagement with the foils, the piston rod extending through a central axial bore in the base of the support member such that the support flange is disposed on one side of the base and the piston head is disposed on an opposite side of the base as the support flange; and
a squib configured to drive the piston element via the piston head from an initial position to a release position in which the support flanges of the piston element no longer engage the support arms, thereby permitting each of the support arms to pivot inwardly in a direction away from a respective one of the foils and the corresponding first or second gas bottle to a position in which each foil will rupture to permit gas to escape from the corresponding gas bottle.

18. The inflator according to claim 17, wherein each support arm further comprises a line of mechanical weakness positioned proximate the base, and wherein each support arm is arranged to pivot inwardly about the line of mechanical weakness in a direction away from a respective one of the foils and corresponding gas bottles to a position in which the respective foil will rupture to permit gas to escape from the corresponding gas bottle.

19. The inflator according to claim 17, wherein the first bottle contains one of a fuel and an oxidisable gas and the second bottle contains an oxidising gas.

20. An inflator according to claim 17 wherein a second squib is provided to ignite mixed gas from the first and second gas bottles, and wherein the second squib is mounted adjacent the first squib and is provided with a flame-guide.

* * * * *